United States Patent [19]

Itoh et al.

[11] Patent Number: 5,024,905
[45] Date of Patent: Jun. 18, 1991

[54] PLATINUM ALLOY ELECTROCATALYST

[75] Inventors: Takashi Itoh, Ichikawa; Katsuaki Katoh, Matsudo, both of Japan

[73] Assignee: N. E. Chemcat Corporation, Tokyo, Japan

[21] Appl. No.: 491,421

[22] Filed: Mar. 9, 1990

[30] Foreign Application Priority Data

Mar. 9, 1989 [JP] Japan ............................... 1-55109

[51] Int. Cl.⁵ .................... H01M 4/92; B01J 23/40
[52] U.S. Cl. ................................... 429/44; 502/326
[58] Field of Search ................ 429/40, 44; 502/326

[56] References Cited

U.S. PATENT DOCUMENTS

| | | | |
|---|---|---|---|
| 4,447,506 | 5/1984 | Luczak et al. | 429/44 |
| 4,711,829 | 12/1987 | Luczak et al. | 429/44 |
| 4,716,087 | 12/1987 | Ito et al. | 429/44 |
| 4,794,054 | 12/1988 | Ito et al. | 429/44 |
| 4,806,515 | 2/1989 | Luczak et al. | 429/44 |

Primary Examiner—Donald L. Walton
Attorney, Agent, or Firm—Wenderoth, Lind & Ponack

[57] ABSTRACT

Disclosed are a platinum alloy electrocatalyst having high activity and a long life comprising an electrically conductive carrier and dispersed in, and deposited on it, a platinum-iron-cobalt-copper quaternary ordered alloy composed of 40 to 70 atomic % of platinum, 9 to 27 atomic % of iron, 9 to 27 atomic % of cobalt and 9 to 27 atomic % of copper, and an electrode for an acid electrolyte fuel cell which electrode comprises the platinum alloy electrocatalyst, a water-repellent binder and a conductive and acid-resistant supporting member, the electrocatalyst and the water-repellent binder being bonded to.

22 Claims, 2 Drawing Sheets

● Pt
○ Fe/Co/Cu

● Pt
○ Fe/Co/Cu

A : CATHODE CATALYST (C-19) (ELECTRODE E-19)
B : CATHODE CATALYST (C-28*)(ELECTRODE E-28*)
C : CATHODE CATALYST (C-26*)(ELECTRODE E-26*)
D : CATHODE CATALYST (C-24*)(ELECTRODE E-24*)
E : CATHODE CATALYST (C-30*)(ELECTRODE E-30*)
F : CATHODE CATALYST (C-16*)(ELECTRODE E-16*)
G : CATHODE CATALYST (C-1*) (ELECTRODE E-1*)

PLATINUM ALLOY ELECTROCATALYST

BACKGROUND OF THE INVENTION

1. Field of the Invention

This invention relates to a supported platinum alloy electrocatalyst, processes for its production, and to an electrode containing the catalyst for use in an acid-electrolyte fuel cell.

2. Description of the Prior Art

The fuel cell is an electrochemical device for directly converting a chemical energy generated from an oxidation-reduction reaction of a fuel such as hydrogen or hydrocarbons and an oxidizer such as oxygen gas supplied thereto into a low-voltage direct current. It is generally comprised of a fuel electrode (anode), an oxidizer electrode (cathode), an electrolyte interposed between the electrodes, and means for separately supplying a stream of the fuel and a stream of the oxidizer to the anode and the cathode, respectively.

An electrocatalyst is used in the anode and the cathode, and in operation, the fuel supplied to the anode is oxidized on the electrocatalyst in the presence of the electrolyte to release electrons. On the other hand, the oxidizing agent supplied to the cathode is reduced on the electrocatalyst in the presence of the electrolyte while consuming the electrons supplied from the anode via an external circuit. At this time, the current flowing through the external circuit is utilized as power under a fixed load.

Thus, the electrocatalyst plays an important role in the fuel cell, and the output and service life of the fuel cell depends greatly upon the activity of the electrocatalyst. In the early days, one or more noble metals selected from platinum (Pt), palladium (Pd), rhodium (Rh), ruthenium (Ru), iridium (Ir), osmium (Os), silver (Ag) and gold (Au) which are among the elements of Groups 8, 9, 10 and 11 of the periodic table (according to the IUPAC nomenclature recommended in November 1983) were used in the form of metal black as the electrocatalyst.

Alloy catalysts comprising these noble metals in combination with one or more base metals such as aluminum, chromium, manganese, iron, cobalt, nickel and copper (U.S. Pat. Nos. 3,428,490 and 3,468,717), and skeleton catalysts resulting from dissolution of the base metal component from these alloys by acid or alkali treatment (U. S. Patent No. 3,429,750) have also been used.

However, because these catalysts have a low metal surface area, they require great quantities of noble metals. Furthermore, since they are very susceptible to sintering in the electrolyte, they have a short active lifetime and are not economical.

Later, a catalyst composed of a noble metal component dispersed and supported on a powdery carrier such as electrically conductive carbon black came into use. This greatly reduced the amount of the noble metal used and increased the economic advantage of fuel cell power generation. However, for a phosphoric acid fuel cell which is now most likely to become practical to gain widespread commercial acceptance as a power generation system, it requires an operation life of at least 40,000 hours at an output efficiency above a reasonable level. An oxygen/hydrogen type phosphoric acid fuel cell has the defect that the activation polarization of an oxygen reduction reaction at the cathode is by far greater than that of a hydrogen oxidation reaction at the anode, and moreover, in the presence of the electrolyte at high temperatures and molecular oxygen as an oxidizer, dissolving and sintering of the active metal readily proceed.

In recent years, in order to develop a fuel cell having a high efficiency, a long life and a low lost, investigations have been made on a carbon powder supported catalyst which is highly active mainly for an oxygen reduction reaction at the cathode. First, supported binary alloy catalysts composed of a platinumgroup metal (one of noble metals of groups 8, 9 and 10 of the periodic table) and a base metal of groups 2 to 6 of the periodic table such as vanadium, aluminum, titanium and chromium, which have a mass activity for oxygen reduction about twice that of a catalyst composed of platinum alone, were found (U. S. Patents Nos. 4186110, 4202934 and 4316944). Thereafter, for higher activity, supported platinum ternary alloy catalysts composed of platinum, vanadium and cobalt or platinum, chromium and cobalt (U.S. Pat. No. 4,447,506), a supported ternary alloy catalyst composed of platinum, cobalt and nickel (Japanese Laid-Open Patent Publication No. 8851/1986) and a supported ternary alloy catalyst composed of platinum, chromium and nickel (Japanese Laid-Open Patent Publication No. 319052/1988) were disclosed. On the other hand, a supported platinum-iron binary ordered alloy $Pt_3Fe$ "superlattice" (synonymous for "ordered") alloy) catalyst was disclosed (Japanese Laid-Open Patent Publication No. 7941/1985). Further, a ternary alloy comprising platinum, chromium and cobalt (U.S. Pat. No. 4,711,829) was again proposed as an ordered alloy catalyst.

The present inventors previously showed that a platinum-iron-cobalt ternary alloy catalyst (Japanese Laid-Open Patent Publication No 163746/1987) brings about an improvement not only in catalytic activity but also in the retention rate of the metal surface area. They also showed that a supported platinum-copper binary alloy catalyst (Japanese Laid-Open Patent Publication No. 269751/1987) surpasses conventional ordered and disordered multi-component alloys particularly in respect of the retention rate of the metal surface area. They also showed that a platinum-iron-copper Tulameenite-type $Pt_2FeCu$ ternary tetragonal ordered alloy catalyst has improved catalytic activity and an improved service life (Japanese Patent Application No. 211621/1988).

However, none of these prior art catalysts can simultaneously satisfy activity and life required of practical fuel cells, and there is still room for improvement.

SUMMARY OF THE INVENTION

It is an object of this invention to provide an electrocatalyst having higher activity and a longer active lifetime than in the prior art, and a fuel cell electrode comprising this electrocatalyst.

This object is achieved in accordance with this invention by a platinum alloy catalyst comprising an electrically conductive carrier, and dispersed in, and deposited on, the carrier, a platinum-iron-cobalt-copper quaternary ordered alloy comprising 40 to 70 atomic % of platinum, 9 to 27 atomic % of iron, 9 to 27 atomic % of cobalt and 9 to 27 atomic % of copper.

The above object is also achieved in accordance with an electrode for an acid electrolyte fuel cell, said electrode comprising a supported platinum alloy electrocatalyst, a water-repellent binder, and an electrically conductive and acid-resistant supporting member to which the electrocatalyst and the water-repellent binder are bonded, said electrocatalyst consisting of an electrically conductive powdery carbon carrier and dispersed in, and deposited on, the carrier, a platinum-iron-cobalt-copper quaternary ordered alloy comprising 40 to 70 atomic % of platinum, 9 to 27 atomic % of iron, 9 to 27 atomic % of cobalt and 9 to 27 atomic % of copper.

DETAILED DESCRIPTION OF THE PREFERRED EMBODIMENTS

Figure 1:
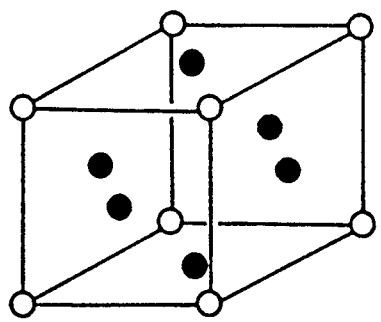
FIG. 1 shows the unit lattice structure of a platinum-iron-cobalt-copper quaternary $L_{12}$-type facecentered cubic ordered alloy.

The present inventors, in order to solve the above-described problems, extensively studied the combination of elements, composition and structure of an alloy having catalytic activity. As a result, they found that platinum-iron-cobalt-copper supported quaternary ordered alloy catalysts have higher activity and a longer life than all conventional ordered and disordered alloy catalysts having up to three components. This finding has led to the present invention.

In the present specification, the catalytic activity for the electrochemical oxygen reduction reaction is evaluated by the maximum current density ($mA/cm^2$ of electrode area) which an oxygen half cell shows at +900 mV vs. a reversible hydrogen reference electrode (RHE; the same hereinafter). The current density per unit platinum mass is referred to herein as mass activity (mA/mg Pt). The quotient obtained by dividing the mass activity by a metal surface area ($m^2$/g Pt) is referred to herein as specific activity ($\mu A/cm^2$ Pt).

The metal surface area is expressed by an electrochemical metal surface area, EC.MSA ($m^2$/g Pt) obtained by measuring the amount of electricity in the course of hydrogen adsorption on a metal surface in the cathodic sweeps of cyclic voltammetry.

The platinum alloy electrocatalyst of this invention is formed from fine particles of a quaternary ordered alloy of platinum-iron-cobalt-copper comprising 40 to 70 atomic % of platinum, 9 to 27 atomic % of iron, 9 to 27 atomic % of cobalt and 9 to 27 atomic % of copper, and an electrically conductive carrier, for example a conductive carbon powder carrier, in and on which these fine particles are dispersed and deposited.

In the present invention, the alloy denotes a substitutional solid solution alloy. In general, the substitutional solid solution formed of platinum and another element can be obtained in various crystal structures depending upon the type and proportion of the other element.

Platinum alone is face-centered cubic (f.c.c), and its X-ray diffraction (XRD) pattern has no diffraction peak at lower diffraction angles $2\theta$ than that of the main diffraction peak (111).

Even with a platinum solid solution alloy, the Bravais lattice of a disordered alloy resulting from quite random substitution of the lattice point of platinum by other elements remains face-centered cubic on an average, and does not show a diffraction peak at the lower diffraction angle $2\theta$ side of (111) in its XRD pattern.

The XRD pattern of an ordered alloy of the $L_{12}$ type ($Pt_3Fe$ type) in which the second metal component predominantly occupies (000) and platinum predominantly occupies ($\frac{1}{2}$, $\frac{1}{2}$, 0) has a diffraction pattern of a primitive cubic lattice.

On the other hand, the XRD pattern of an ordered alloy of the $L_{10}$ type (Pt-Fe type) in which platinum occupies (000) and ($\frac{1}{2}$, $\frac{1}{2}$, 0) and the second component element occupies the remaining ($\frac{1}{2}$, 0, $\frac{1}{2}$) and (0, $\frac{1}{2}$, $\frac{1}{2}$) among the face-centered cubic lattice points of platinum has a diffraction pattern of a facecentered tetragonal system (f.c.t.).

In such ordered alloys, new diffraction peaks, i.e. ordered diffraction peaks, (100) and (110) occur on the lower diffraction angle side of a main diffraction peak (111). The difference between the $L_{12}$ type and the $L_{10}$ type is confirmed by XRD pattern in which while in the former (220) and (202) are equivalent and become one diffraction line, they are non-equivalent and two diffraction peaks appear in the latter.

Figure 2:
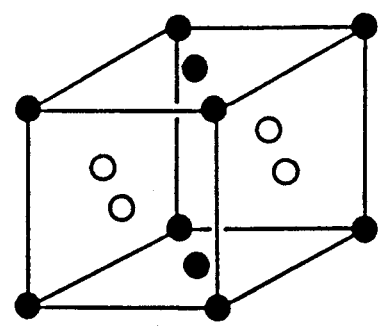
FIG. 2 shows the unit lattice structure of a platinum-iron-cobalt-copper quaternary L10-type facecentered tetragonal ordered alloy.

The platinum-iron-cobalt-copper quaternary ordered alloy within the composition range of this invention could include a face-centered cubic $L_{12}$-type [$Pt_3(Fe/Co/Cu)_1$ type) alloy (see FIG. 1), a facecentered tetragonal $L_{10}$-type [$Pt_1(Fe/Co/Cu)_1$ type] alloy (see FIG. 2), and a mixture of these.

It is presumed that in the $L_{12}$-type alloy, platinum preferentially occupies ($\frac{1}{2}$, $\frac{1}{2}$, 0) among the f.c.c. lattice points of platinum, and the iron, cobalt or copper atoms randomly occupy (000). It is presumed on the other hand that in the $L_{10}$-type alloy, platinum occupies (000) and ($\frac{1}{2}$, $\frac{1}{2}$, 0) among the f.c.c. lattice points of platinum, and the iron, cobalt or copper atoms randomly occupy the remaining points ($\frac{1}{2}$, 0, $\frac{1}{2}$) and (0, $\frac{1}{2}$, $\frac{1}{2}$). Consequently, the axial length in the direction of the C axis is shortened, and the lattice parameters become $a=b\neq c$, $a>c$.

The lattice parameter a of a cubic ordered alloy within the desirable composition range of the catalyst of this invention varies from the f.c.c. lattice parameter of platinum alone, a=3.923Å to the lattice parameter of f.c.c. $\gamma$-Fe (extrapolated to room temperature), a=3.72Å, to the f.c.c. lattice parameter of cobalt, a=3.555Å or to the f.c.c. lattice parameter of copper, a=3.615Å, depending upon its composition. Thus, the above alloy has a lattice parameter a in the range of 3.77 to 3.86Å.

The lattice parameters of the tetragonal ordered alloy within the desirable composition range of the catalyst of this invention are approximately a=3.83 to 3.87Å, c=3.68 to 3.73Å, c/a=0.955 to 0.970.

With regard to the proportions of the metals deposited on the quaternary alloy catalyst of this invention, if the proportion of at least one of the iron, cobalt and copper elements is less than 9 atomic %, or the proportion of platinum exceeds 70 atomic %, the effect of adding iron, cobalt and copper on the activity of the catalyst does not appear markedly, and the resulting catalyst only shows activity equivalent to that of a catalyst comprising platinum alone, that of platinum-iron, platinum-cobalt and platinum-copper binary alloy catalyst, or that of a platinum-iron-cobalt or platinum-iron-copper ternary alloy catalyst.

Even if the proportions of all of iron, cobalt and copper are at least 9 atomic %, but if the proportion of at least one of them exceeds 27 atomic %, and the proportion of platinum is at most 55 atomic %, or if the proportion of platinum is less than 40 atomic %, unnegligible proportions of iron, cobalt and/or copper dissolve in the acid electrolyte and disintegration of the alloy phase occurs to reduce the stability of the catalyst.

The composition range which brings about an increase both in catalytic activity and in catalyst stability is 40 to 70 atomic % for platinum, 9 to 27 atomic % for iron, 9 to 27 atomic % for cobalt and 9 to 27 atomic % for copper.

Preferably, the platinum-iron-cobalt-copper alloy of this invention is deposited on an electrically conductive carrier in a highly dispersed state having a metal surface area of at least 30 m$^2$/g, desirably at least 60 m$^2$/g. If the metal surface area is less than 30 m$^2$/g, the activity of the catalyst per unit weight of alloy is insufficient, and such the catalyst is not economical.

An electrically conductive carbon powder is preferred as a carrier for supporting this alloy. For example, a conductive carbon black powder, an acetylene black powder or a graphite powder may be used. Specific examples include oil furnace black sold under the tradenames Vulcan XC-72R and XC-72 (products of Cabot Corporation), Conductex 975 (a product of Columbian Chemicals Co.), and acethylene black sold under the tradename Shawinigan Black (a product of Gulf Oil Corporation).

Vulcan XC-72 or Conductex 975 is desirably heat-treated at high temperatures in vacuum or in an inert gas atmosphere to perform partial graphitization treatment and thereby to increase corrosion resistance as a carrier of electrocatalyst used under highly corrosive conditions in which the acid electrolyte at high temperatures and an oxidizer such as oxygen are present.

The carrier material generally has a BET surface area of 60 to 250 m$^2$/g and an average particle diameter of 0.1 to 50 microns.

The amount of loading of platinum on the carrier in the supported platinum alloy catalyst of this invention is usually 0.1 to 30% by weight, preferably 5 to 15% by weight, based on the total weight of the carrier and the platinum alloy. If its loading amount exceeds 30% by weight, the degree of dispersion on the carrier relatively decreases, and no improvement in performance is obtained with an increased amount of the alloy used, and the economic advantages of using the carrier is reduced. On the other hand, when the loading amount of alloy on the catalyst is lowered, there is an upper limit to the degree of the dispersion of alloy. If the loading amount of the alloy is extremely lowered under the limit, the activity per unit mass of the catalyst conversely decreases. Consequently, a large amount of the catalyst becomes necessary. This is not desirable.

The supported ordered alloy catalyst of this invention can be prepared, for example, by the following procedure.

First, a powdery material such as conductive carbon black is contacted with an aqueous solution or aqueous suspension (slurry) of metal components constituting the alloy to adsorb or impregnate the metal compounds or their ions on or in the carrier. Then, while the slurry is stirred at a high speed, a diluted aqueous solution of a suitable fixing agent such as an ammonia, hydrazine, formic acid or formalin is slowly added dropwise, and the metal components are dispersed in, and deposited on, the carrier as insoluble compounds or as partly reduced fine metal particles.

Acids or salts such as divalent or tetravalent chloroplatinic acid, chloroplatinate salts, and solublized $H_2Pt(OH)_6$ may be used as platinum compounds.

Examples of the iron compounds are ferrous chloride, ferric chloride, ferrous nitrate, ferric nitrate, ferrous sulfate and ferric sulfate. Examples of the cobalt compounds include cobalt nitrate and cobalt sulfate. Examples of the copper compounds are cuprous chloride, cupric chloride, cupric nitrate and cupric sulfate.

In depositing these metal compounds on the carrier, a method of simultaneous depositing of four components may be applied by using a mixed solution of four species of platinum, iron, cobalt and copper. Alternatively, there may be applied various types of multi-step depositing methods, which comprise, for example, preparing a supported platinum catalyst having only platinum deposited thereon, and thereafter, simultaneously depositing iron, cobalt and copper on it, or first loading iron, then, loading cobalt and finally loading copper. However, because of the ease and simplicity of operation, and the ease of controlling the loading amounts of the individual components, a two-step depositing method comprising simultaneously loading three components of iron, cobalt and copper on a supported platinum catalyst prepared previously is practical.

The slurry of the catalyst precursor having platinum, iron, cobalt and copper dispersed and deposited thereon is filtered and dried in a stream of nitrogen Then, the dried product is reduced and alloyed by heat-treatment in a hydrogen atmosphere or in an atmosphere of an inert gas containing hydrogen. By heat-treatment in an inert gas containing no hydrogen or in vacuum, reduction and alloying occur to some extent with the reducing action of the carbon material as the carrier. The degree of this alloying is frequently insufficient, and the resulting catalyst, in many cases, does not exhibit sufficient catalytic activity.

Generally, alloying of the loaded components require high-temperature treatment to some extent.

The quaternary platinum-iron-cobalt-copper catalyst within the composition range of this invention scarcely undergo solid solution alloying at a temperature of 600° C. or below. The formation of a solid solution alloy occurs for the first time at 600° C. or above. The product formed at a relatively low temperature region from 600° C. to 900° C. is a cubic ordered alloy. The formation of a tetragonal ordered alloy requires high-temperature treatment at 850° C. to about 1,050° C., preferably 900° to 1,000° C. The time during which the above material is to be held at the above temperature is 30 minutes to 2 hours.

Heat-treatment at an excessively high temperature for a long period of time should be avoided because it grows the crystallite size of the alloy and decreases the surface area of the resulting catalyst. The optimum temperature and time for the alloying treatment depend upon the particle sizes and the degree of dispersion of the metals or their compounds deposited on the catalyst precursor before reduction and alloying. When the particle diameter is small and the components are highly dispersed, sufficient alloying proceeds at lower temperatures within a shorter period of time to give an alloy having a small crystallite diameter in the highly dispersed state.

The preferred alloy crystallite diameter of the ternary ordered alloy in accordance with this invention is not more than 100Å, especially not more than 50Å. To obtain such fine crystallite, the slurry concentration, the rate of dropwise addition of the fixing agent and the stirring speed in the loading step and the heat-treatment temperature and time in the reduction and alloying step should be controlled so that the particle diameter of the metals or their compounds loaded on the catalyst precursor is not more than 50Å preferably not more than 30Å.

The temperature, at which a tetragonal ordered alloy as a preferred crystal structure in accordance with this invention is formed, depends also upon the chemical existing states of the individual metal components on the catalyst precursor. As stated hereinabove, a tetragonal ordered alloy can be formed at 850° to 900° C. by subjecting a catalyst precursor containing platinum and iron to reduction and alloying treatment at 800° to 900° C. to form a cubic ordered alloy of platinum and iron, dispersing and depositing copper on it, and again heating the mass for alloying. On the other hand, when iron and copper are loaded simultaneously on a supported platinum catalyst and alloying is carried out in one step, high temperatures of 950° to 1,050° C. are required to obtain a tetragonal ordered alloy. According to the two-step alloying method in accordance with this invention, although the catalyst preparation procedure is more complicated, a tetragonal ordered alloy can be formed at lower temperatures. As a result, the crystallite size of the resulting alloy can be made smaller than in the case of one-step alloying, and an alloy catalyst having a larger metal surface area can be formed. The resulting catalyst has the synergistically large mass activity, which is obtained as the product of the larger metal surface area multiplied by higher specific activity to be described below, and its performance is high.

The oxygen reduction specific activity of the platinum-iron-cobalt-copper quaternary ordered alloy catalyst of this invention is higher than any of the multi-component alloy catalysts previously reported, and is at least 3.5 times that of a catalyst of platinum alone supported on the same carrier. A catalyst which contains platinum, iron, cobalt and copper but does not form a sufficiently ordered alloy shows only lower specific activity. Among the ordered alloys, a tetragonal ordered alloy of the Tulameenite-type shows higher specific activity and higher catalyst stability than a cubic ordered alloy.

The stability of the electrocatalyst is defined by the rate of retention of EC.MSA before and after the electrode is maintained for a fixed period of time under loading of a fixed potential in an electrolyte, or by the reciprocal of the decay rate of cell terminal voltage after the acid electrolyte fuel cell is operated for a fixed period of time at a fixed current density.

The electrode of this invention for an acid electrolyte fuel cell using such a platinum alloy electrocatalyst will now be described. The fuel cell electrode is obtained by binding the platinum-iron-cobalt-copper supported quaternary ordered alloy catalyst and a water-repellent binder such as polytetrafluoroethylene, polyfluoroethylenepropylene or a trifluoroalkoxypolyethylene to an electrically conductive and acid-resistant supporting member such as graphite paper or a tantalum or niobium screen previously subjected to water-repelling treatment, and is especially useful as an oxygen reduction cathode of a phosphoric acid-type fuel cell. The water-repellent binder is required in order to bind the catalyst layer to the conductive supporting member, and also render the catalyst layer sufficiently able to diffuse a reactant gas such as hydrogen or oxygen or a product gas such as water in the electrolyte, and to form a three-phase interface of gas, liquid and solid.

The electrode of this invention may be fabricated, for example, by the following procedure. First, the above platinum-iron-cobalt-copper supported quaternary ordered alloy catalyst is produced as above. The resulting catalyst powder is mixed with a water-repellent binder such as a polytetrafluoroethylene suspension (commercially available from E. I. Du Pont de Nemours & Co. under the tradename of TFE-30) or another waterrepellent binder composed of an acid-resistant polymer material to form a homogeneous suspension. The homogeneous suspension of the catalyst and the waterrepellent binder is spread by a suction filtration method, a spraying method, a roll coating method, etc. on a graphite paper as a supporting member previously subjected to water-repelling treatment with an acidresistant polymer material. The resulting material is then calcined in an atmosphere of an inert gas.

Desirably, the platinum alloy is present on the supporting member in a catalytically effective amount. The catalytically effective amount generally corresponds to about 0.1 to 2 mg, preferably about 0.2 to 1 mg, more preferably about 0.3 to 0.7 mg, of the platinum-iron-cobalt-copper alloy per $cm^2$ of the geometrical surface area of the electrode supporting member.

The above electrode of the invention can be utilized as a general gas diffusing electrode such as a button battery cell electrode, a gas sensor electrode and an electrolytic cell electrode, but especially preferable as an electrode for an acid electrolyte fuel cell. Examples of the electrolyte used in such a fuel cell include sulfuric acid, hydrochloric acid, and various superacids such as trifluoromethanesulfonic acid, difluoromethanedisulfonic acid, and polytrifluoroethylenesulfonic acid, in addition to phosphoric acid.

The following examples and comparative examples illustrate the present invention. It should be understood however that the present invention is not limited to these examples alone.

[A] Production of Catalysts Comparative Example 1 (Production Example 1)

Supported Pt/C catalyst:

81 g of heat-treated conductive carbon black (Cabot, Vulcan XC-72R) having a specific surface area of 110 $m^2/g$, was slurried in 1,500 ml of deionized water containing 4.0 g of glacial acetic acid. 9.0 g of Pt as $H_2Pt(OH)_6$, was dissolved together with an amine in 600 ml of an aqueous solution. While the carbon slurry was stirred, a platinum solution was added. 50 g of 5% formic acid as a reducing agent, was gradually added, and the temperature of the slurry was gradually elevated to about 95° C. The slurry was then maintained at 95° C. for 30 minutes, and then allowed to cool to room temperature. It was filtered, washed with deionized water. The filtration cake was dried in a nitrogen stream at 95° C. for 16 hours. The resulting 10% by weight Pt/C catalyst (C-1*) (the asterisk means a comparative example; the same hereinafter) had an MSA of 120 $m^2/g$.

Example 1 (Production Example 2)

Supported Pt-Fe-Co-Cu (atomic ratio 50:17:17:17) cubic ordered alloy catalyst:

50 g of the Pt/C catalyst (C-1*) obtained in Production Example 1 was dispersed in 1,000 ml of deionized water by ultrasonic blender to form a homogeneous slurry. While the slurry was vigorously stirred, 150 ml of a mixed aqueous solution containing 0.48 g of Fe as iron nitrate (III), 0.50 g of Co as cobalt nitrate (II) and 0.54 g of Cu as copper nitrate (II) was added to the slurry. Then, while a 5% diluted aqueous solution of hydrazine was slowly added dropwise, the pH of the slurry was adjusted to 8.0. The slurry was maintained for 1 hour with stirring, and filtered. The filtration cake was washed with deionized water, and dried at 95° C. in a stream of nitrogen. The dried cake was heated at 900° C. for 1.2 hours in a stream of 7% by volume of hydrogen (the remainder being nitrogen) and allowed to cool to room temperature to give a carbon-supported Pt-Fe-Co-Cu alloy catalyst (C-2).

In the powder X-ray diffraction (CuK$\alpha$ ray) of this catalyst, ordered peaks (100) $2\theta = 23.3°$ [appearing as a shoulder of a diffraction peak of graphite (002) of the carbon black carrier] and (110) $2\theta = 33.1°$, which were not seen in the XRD pattern of the catalyst comprising platinum alone (C-1*), appeared on the lower diffraction angle side of the main diffraction peak (111) $2\theta = 40.95°$, and only one peak appeared near $2\theta = 69.6°$ in the (220) diffraction angle area. Accordingly, this product was identified as $L_{12}$-type cubic ordered alloy. The lattice parameter a was 3.815Å, and the crystallite size was 33Å.

Observation under an analytical transmission electron microscope, consisting of a high-resolution transmission electron microscope combined with an Angstrom X-ray microanalyzer, showed that the composition of the alloy particles having a size of 25 to 50Å was Pt:Fe:Co:Cu atomic ratio = 50:17:17:17 and the product was a solid solution alloy of Pt$_2$(Fe Co Cu).

Comparative Example 2 (Production Example 3)

Supported Pt-Fe-Co-Cu (atomic ratio 50:17:17:17) catalyst:

By the same procedure as in Production Example 2 except that after depositing Fe, Co and Cu on Pt/C in Production Example 2, the filtration cake was heated for 2 hours at 500° C. in a nitrogen stream, a carbonsupported Pt-Fe-Co-Cu catalyst (C-3*) was produced.

XRD peaks appeared at $2\theta(111)=40.24°$ and $2\theta(220)=68.3°$. It was determined therefore that alloying occurred partly, but as a whole, the product was still in the non-alloyed state, namely in the state of a mixture of Pt, Fe, Co and Cu.

Example 2 (Production Example 4)

Supported Pt-Fe-Co-Cu cubic ordered alloy catalyst:

Production Example 2 was repeated except that the weights of the iron (III) nitrate, copper (II) nitrate and cobalt (II) nirate were varied. Carbonsupported Pt-Fe-Co-Cu alloy catalysts having a Pt:Fe:Co:Cu atomic ratio of 61:13:13:13, 50:25:13:13 and 43:19:19:19 (designated respecitvely as C-4, C-5 and C-6) were produced.

XRD led to the determination that these supported alloys were cubic ordered alloys. The lattice parameters and crystallite sizes of the catalysts obtained are summarized in Table 1.

TABLE 1

| Production Example No. | Catalyst (atomic ratio of the alloy) | Catalyst No. | Solid solution alloy Crystal structure | Ordering | Lattice parameter of alloy crystals a (Å) | c (Å) | c/a | Crystallite size (Å) |
|---|---|---|---|---|---|---|---|---|
| 2 | Pt—Fe—Co—Cu (50:17:17:17)/C | C-2 | cubic | ordered | 3.815 | — | — | 33 |
| 4 | Pt—Fe—Co—Cu (61:13:13:13)/C | C-4 | cubic | ordered | 3.847 | — | — | 42 |
| " | Pt—Fe—Co—Cu (50:25:13:13)/C | C-5 | cubic | ordered | 3.825 | — | — | 35 |
| " | Pt—Fe—Co—Cu (43:19:19:19)/C | C-6 | cubic | ordered | 3.790 | — | — | 37 |
| 5 | Pt—Fe—Co—Cu (50:17:17:17)/C | C-7 | tetragonal | ordered | 3.863 | 3.709 | 0.9600 | 55 |
| 6 | Pt—Fe—Co—Cu (50:13:13:25)/C | C-8 | tetragonal | ordered | 3.840 | 3.695 | 0.9622 | 56 |
| " | Pt—Fe—Co—Cu (61:13:13:13)/C | C-9 | tetragonal | ordered | 3.848 | 3.695 | 0.9602 | 58 |
| 10 | Pt—Fe—Co—Cu (50:25:13:13)/C | C-18 | tetragonal | ordered | 3.860 | 3.695 | 0.9573 | 48 |
| " | Pt—Fe—Co—Cu (50:17:17:17)/C | C-19 | tetragonal | ordered | 3.858 | 3.724 | 0.9653 | 45 |
| " | Pt—Fe—Co—Cu (43:27:10:20)/C | C-20 | tetragonal | ordered | 3.847 | 3.688 | 0.9587 | 43 |
| 3 | Pt—Fe—Co—Cu (50:17:17:17)/C | C-3* | f.c.c. | disordered | 3.879 | — | — | 31 |
| 7 | Pt—Fe—Co—Cu (25:25:25:25)/C | C-10* | cubic | ordered | 3.736 | — | — | 47 |
| " | Pt—Fe—Co—Cu (73:9:9:9)/C | C-11* | cubic | ordered | 3.875 | — | — | 44 |
| " | Pt—Fe—Co—Cu (82:6:6:6)/C | C-12* | cubic | ordered | 3.903 | — | — | 54 |
| 8 | Pt—Fe—Co—Cu (42:41:10:8)/C | C-13* | tetragonal | ordered | 3.850 | 3.695 | 0.9597 | 62 |
| " | Pt—Fe—Co—Cu (50:22:22:6)/C | C-14* | tetragonal | ordered | 3.843 | 3.730 | 0.9705 | 59 |
| " | Pt—Fe—Co—Cu (37:12:10:40)/C | C-15* | tetragonal | ordered | 3.846 | 3.664 | 0.9527 | 54 |

Example 3 (Production Example 5)

Supported Pt-Fe-Co-Cu (atomic ratio 50:17:17:17) tetragonal ordered alloy (one-step alloying):

Production Example 2 was repeated except that the dried filtration cake was heated for 1.2 hours at 1000° C. in a stream of 7% by volume of hydrogen (remainder being nitrogen). A carbon-supported Pt-Fe-Co-Cu (atomic ratio 50:17:17:17) alloy catalyst (C-7) was thus produced.

XRD patterns of this catalyst had ordered peaks at (100) $2\theta = 23.0°$ and (110) $2\theta = 32.8°$, and two diffraction peaks at (220) $2\theta = 68.7$ and (202) $2\theta = 70.3$ in the (220) diffraction region and therefore, this catalyst was identified as an $L_{10}$-type tetragonal ordered alloy. The lattice parameters were a=3.863, c=3.709, c/a=0.9600. The crystallite size was 55Å.

Example 4 (Production Example 6)

Supported Pt-Fe-Co-Cu tetragonal ordered alloy catalysts:

Production Example 5 was repeated except that the weights of iron (III) nitrate, cobalt (II) nitrate and copper (II) nitrates charged were varied. Thus, carbon-supported Pt-Fe-Co-Cu alloy catalysts (C-8 and C-9) having a Pt:Fe:Co:Cu atomic ratio of 50:13:13:25 and 61:13:13:13, respectively, were produced.

XRD led to the determination that these catalysts were tetragonal ordered alloys. The lattice parameters and crystallite sizes of these catalysts are summarized in Table 1.

Comparative Example 3 (Production Example 7)

Supported Pt-Fe-Co-Cu cubic ordered alloy catalysts:

Production Example 2 was repeated except that the weights of iron (III) nitrate, cobalt (II) nitrate and copper (II) nitrate charged were changed. Thus, carbon-supported Pt-Fe-Co-Cu alloy catalysts (C-10*, C-11* and C-12*) having a Pt:Fe:Co:Cu atomic ratio of 25:25:25:25, 73:9:9:9 and 82:6:6:6, respectively, were produced.

XRD showed that these supported alloys were cubic ordered alloys. Their lattice parameters and crystallite sizes are summarized in Table 1.

Comparative Example 4 (production Example 8)

Supported Pt-Fe-Co-Cu tetragonal ordered alloy catalysts:

Production Example 5 was repeated except that the weights of the iron (III) nitrate, cobalt (II) nitrate and copper (II) nitrate charged were varied. Thus, carbon-supported Pt-Fe-Co-Cu alloy catalysts (C-13*, C-14* and C-15*) having a Pt:Fe:Co:Cu atomic ratio of 42:41:10:8, 50:22:22:6, and 37:12:10:40, respectively, were produced.

XRD showed that these supported alloys were tetragonal ordered alloys. Their lattice parameters and crystallite sizes are summarized in Table 1.

Comparative Example 5 (Production Example 9)

Supported Pt-Fe cubic ordered alloy catalysts:

Production Example 2 was repeated except that an aqueous solution containing 0.72 g of Fe as iron (III) nitrate was used, and only Fe was deposited on the carbon-supported Pt catalyst (C-1*). Thus, a carbonsupported Pt-Fe (atomic ratio 67:33) alloy catalyst (C-16*) was produced. Likewise, a carbon-supported Pt-Fe alloy catalyst (C-17*) having a Pt:Fe atomic ratio of 50:50 was produced by changing the weight of iron (III) nitrate charged.

XRD showed that all of these alloy catalysts were cubic ordered alloys. Their lattice parameters and crystallite sizes are summarized in Table 2.

persed in 1,000 ml of deionized water by ultrasonic blender to form a homogeneous slurry. While the slurry was vigorously stirred sufficiently, 75 ml of an aqueous solution containing 0.38 g of Co as cobalt (II) nitrate and 0.41 g of Cu as copper (II) nitrate was added to the slurry. Then, a 5% diluted aqueous solution of hydrazine was slowly added over 1 hour, and the pH of the slurry was adjusted to 8.0.

The slurry was filtered, washed and dried and again subjected to an alloying treatment in accordance with Production Example 2 to produce a carbon-supported Pt-Fe-Co-Cu (atomic ratio 50:25:13:13) catalyst (C-18).

Likewise, fixed amounts of Co and Cu were additionally deposited on a supported Pt-Fe alloy catalyst prepared as in Production Example 9 by changing the amount of Fe deposited, and then alloying was carried out again to prepare supported Pt-Fe-Co-Cu tetragonal ordered alloy catalysts (designated as C-19 and C-20) having Pt:Fe:Co:Cu atomic ratio 50:17:17:17 and 43:27:10:20, respectively).

Their lattice parameters and crystallite sizes are shown in Table 1.

It is seen that the crystallite sizes of quaternary Pt-Fe-Co-Cu tetragonal ordered alloy catalysts, C-18, C-19 and C-20, prepared by the two-step alloying treatment at 900° C. are smaller than those of catalysts C-7, C-8 and C-9 prepared by the one-step alloying treatment at 1,000° C.

Comparative Example 6 (Production Example 11)

Supported Pt-Fe (atomic ratio 50:50) tetragonal ordered alloy catalyst:

Production Example 5 was repeated except that only Fe was deposited on the carbon-supported Pt catalyst (C-1*) by using an aqueous solution containing 0.72 g of Fe as iron (III) nitrate. As a result, a carbonsupported Pt-Fe (atomic ratio 50:50) alloy catalyst (C-21*) was obtained.

XRD led to the determination that a tetragonal ordered alloy having lattice parameters (a=3.863Å, c=3.722Å, c/a=0.9635) was formed.

Comparative Example 7 (Production Example 12)

TABLE 2

| Production Example No. | Catalyst (atomic ratio of the alloy) | Catalyst No. | Solid solution alloy | | Lattice parameter of alloy crystals | | | Crystallite size (Å) |
| --- | --- | --- | --- | --- | --- | --- | --- | --- |
| | | | Crystal structure | Ordering | a (Å) | c (Å) | c/a | |
| 1 | Pt/C | C-1* | f.c.c. | | 3.923 | — | — | 23 |
| 9 | Pt—Fe (67:33)/C | C-16* | cubic | ordered | 3.862 | — | — | 34 |
| " | Pt—Fe (50:50)/C | C-17* | cubic | ordered | 3.847 | — | — | 39 |
| 11 | Pt—Fe (50:50)/C | C-21* | tetragonal | ordered | 3.863 | 3.722 | 0.9635 | 61 |
| 12 | Pt—Co (67:33)/C | C-22* | f.c.c. | disordered | 3.861 | — | — | 33 |
| " | Pt—Co (50:50)/C | C-23* | f.c.c. | disordered | 3.827 | — | — | 32 |
| 13 | Pt—Cu (67:33)/C | C-24* | f.c.c. | disordered | 3.836 | — | — | 35 |
| " | Pt—Cu (50:50)/C | C-25* | f.c.c. | disordered | 3.794 | — | — | 37 |
| 14 | Pt—Fe—Co (50:25:25)/C | C-26* | cubic | ordered | 3.817 | — | — | 35 |
| 15 | Pt—Fe—Cu (50:25:25:/C | C-27* | cubic | ordered | 3.834 | — | — | 38 |
| 16 | Pt—Fe—Cu (50:25:25)/C | C-28* | tetragonal | ordered | 3.887 | 3.639 | 0.9362 | 40 |
| 17 | Pt—Co—Cu (50:25:25)/C | C-29* | f.c.c. | disordered | 3.808 | — | — | 34 |
| 18 | Pt—Cr—Co (50:25:25)/C | C-30* | cubic | ordered | 3.827 | — | — | 36 |
| 19 | Pt—Co—Ni (50:25:25)/C | C-31* | f.c.c. | disordered | 3.789 | — | — | 32 |
| 20 | Pt—Cr—Ni (50:25:25)/C | C-32* | cubic | ordered | 3.820 | | | 33 |

Example 5 (Production Example 10)

Supported Pt-Fe-Co-Cu (atomic ratio 50:25:13:13) tetragonal ordered alloy catalysts (multi-step alloying):

50 g of the carbon-supported Pt-Fe alloy catalyst (C-16*), obtained in Production Example 9, was dis- Supported Pt-Co disordered alloy catalysts:

Production Example 2 was repeated except that Co alone was deposited on the carbon-supported Pt catalyst (C-1*) by using an aqueous solution containing 0.76 g of Co as cobalt (II) nitrate. Thus, a supported Pt-Co (atomic ratio 67:33) alloy catalyst (C-22*) was produced. XRD led to the determination that an f.c.c. solid solution alloy having a lattice parameter a of 3.861 and a crystallite size of 33Å was formed. No ordered peak was detected.

Likewise, 1.51 g of Co was deposited on a carbon-supported Pt catalyst (C-1*), and alloying was carried out in accordance with the Production Example 2. A supported Pt-Co (atomic ratio 50:50) alloy catalyst (C-23*) was produced.

No ordered peak was detected by XLD.

Comparative Example 8 (production Example 13)

Supported Pt-Cu disordered alloy catalysts:

Production Example 2 was repeated except that only Cu was deposited on the carbon-supported Pt catalyst (C-1*) by using an aqueous solution containing 0.82 g of Cu as copper nitrate. Thus, a supported Pt-Cu (atomic ratio 67:33) alloy catalyst (C-24*) was produced. XRD led to the determination that an f.c.c. solid solution alloy having a lattice parameter a of 3.836Å and a crystallite size of 35Å was formed. No ordered peak was detected.

Likewise, 1.63 g of Cu was deposited on the carbon supported Pt catalyst (C-1*) in accordance with Production Example 2 to produce a supported Pt-Cu (atomic ratio 50:50) alloy catalyst (C-25*) When, in this procedure, the catalyst precursor was alloyed in accordance with Production Example 5, only the crystallite size of the alloy increased to 89Å, but the resulting alloy remained disordered.

Comparative Example 9 (Production Example 14)

Supported Pt-Fe-Co (atomic ratio 50:25:25) cubic ordered alloy catalyst:

Production Example 2 was repeated except that Fe and Co were deposited on the carbon-supported Pt catalyst (C-1*) by using a mixed aqueous solution containing 0.72 g of Fe as iron (III) nitrate and 0.76 g of Co as cobalt (II) nitrate. Thus, a supported Pt-Fe-Co alloy catalyst (C-26*) was produced.

XRD led to the determination that a cubic ordered alloy having a lattice parameter a of 3.817Å and a crystallite size of 35Å was formed.

Comparative Example 10 (Production Example 15)

Supported Pt-Fe-Cu (atomic ratio 50:25:25) cubic ordered alloy catalyst:

Production Example 2 was repeated except that Fe and Cu were deposited on the carbon-supported Pt catalyst (C-1*) by using a mixed aqueous solution containing 0.72 g of Fe as iron (III) nitrate and 0.81 g of Cu as copper (II) nitrate. Thus, a supported Pt-Fe-Cu alloy (C-27*) was obtained XRD led to the determination that a cubic ordered alloy having a lattice parameter a of 3.834Å and a crystallite size of 38Å was formed.

Comparative Example 11 (Production Example 16)

Supported Pt-Fe-Cu (atomic ratio 50:25:25) tetrabonal ordered alloy catalyst:

Production Example 10 was repeated except that 0.82 g of Cu alone was deposited on 50 g of the carbonsupported Pt-Fe alloy catalyst (C-16*) of Production Example 9. Thus, a supported Pt-Fe-Cu alloy catalyst (C-28*) was produced.

XRD led to the determination that a tetragonal ordered alloy having lattice parameters (a=3.887Å, c=3.639Å, c/a=0.9362) and a crystallite size of 40Å was formed.

Comparative Example 12 (Production Example 17)

Supported Pt-Co-Cu (atomic ratio 50:25:25) disordered alloy catalyst:

Production Example 2 was repeated except that Co and Cu were deposited on the supported Pt catalyst (C-1*) by using a mixed aqueous solution containing 0.76 g of Co and 0.81 g of Cu as copper (II) nitrate. Thus, a supported Pt-Co-Cu alloy catalyst (C-29*) was produced.

XRD led to the determination of an f.c.c disordered alloy having a lattice parameter a of 3.808Å and a crystallite size 34Å was formed Comparative Example 13 (Production Example 18)

Supported Pt-Cr-Co (atomic ratio 50:25:25) ordered alloy catalyst:

Production Example 2 was repeated except that Cr and Co were deposited on the supported Pt catalyst (C-1*) by using a mixed aqueous solution containing 0.67 g of Cr as chromium (III) nitrate and 0.76 g of Co as cobalt (II) nitrate Thus, a supported Pt-Cr-Co alloy catalyst (C-30*) was formed.

XRD led to the determination that a cubic ordered alloy having a lattice parameter a of 3.827Å and a crystallite size of 36Å was formed.

Comparative Example 14 (Production Example 19)

Supported Pt-Co-Ni (atomic ratio 50:25:25) disordered alloy catalyst:

Production Example 2 was repeated except that Co and Ni were deposited on the supported Pt catalyst (C-1*) by using a mixed aqueous solution containing 0.76 g of Co as cobalt (II) nitrate and 0.75 g of Ni as nickel (II) nitrate. Thus, a supported Pt-Co-Ni alloy catalyst (C-31*) was produced.

XRD led to the determination that an f.c.c. disordered alloy having a lattice parameter a of 3.789Å and a crystallite size of 32Å was formed.

Comparative Example 15 (Production Example 20)

Supported Pt-Cr-Ni (atomic ratio 50:25:25) ordered alloy catalyst:

Production Example 2 was repeated except that Cr and Ni were deposited on the supported Pt catalyst (C-1*) by using a mixed aqueous solution containing 0.67 g of Cr as chromium (III) nitrate and 0.75 g of Ni as nickel (II) nitrate. Thus, a supported Pt-Cr-Ni alloy catalyst (C-32*) was produced.

XRD led to the determination that a cubic ordered alloy having a lattice parameter a of 3.820Å and a crystallite size of 33Å was formed.

[20] Production of electrodes

Each of the catalysts obtained in Production Examples 1 to 19, C-1*, C-2, C-3*, C-4 to C-9, C-10* to C-17*, C-18 to C-20, and C-21* to C-32*, was dispersed by an ultrasonic blender in an aqueous dispersion of polytetrafluoroethylene (TEFLON ®, TFE-30, a product of E. I. Du Pont de Nemours and Co.). Aluminum trichloride was added to the mixed slurry to flocculate and precipitate a cotton-like floc. The cotton-like floc containing the catalyst and polytetrafluoroethylene in a dry weight ratio of 50:50 was spread on a supporting member composed of graphite paper previously subjected to a waterrepelling treatment with polytetrafluoroethylene.

The resulting material was pressed, dried, and calcined in a nitrogen stream at 350° C. for 15 minutes to provide to obtain specific activity (μA/cm² Pt). The results are shown in Tables 3 and 4.

TABLE 3

| Electrode No. | Catalyst | Oxygen reduction specific activity (μA/cm² Pt) | EC.MSA (m²/g Pt) Before testing | After testing for 50 hours at 200° C. and +0.7 V | Retention (%) |
| --- | --- | --- | --- | --- | --- |
| E-2 | Pt—Fe—Co—Cu/C | 128 | 88 | 64 | 73 |
| E-4 | Pt—Fe—Co—Cu/C | 125 | 81 | 58 | 72 |
| E-5 | Pt—Fe—Co—Cu/C | 120 | 84 | 62 | 74 |
| E-6 | Pt—Fe—Co—Cu/C | 122 | 84 | 61 | 73 |
| E-7 | Pt—Fe—Co—Cu/C | 130 | 53 | 42 | 79 |
| E-8 | Pt—Fe—Co—Cu/C | 129 | 54 | 43 | 80 |
| E-9 | Pt—Fe—Co—Cu/C | 133 | 49 | 39 | 80 |
| E-18 | Pt—Fe—Co—Cu/C | 135 | 68 | 53 | 78 |
| E-19 | Pt—Fe—Co—Cu/C | 136 | 74 | 60 | 81 |
| E-20 | Pt—Fe—Co—Cu/C | 134 | 67 | 50 | 75 |
| E-3* | Pt—Fe—Co—Cu/C | 68 | 93 | 56 | 60 |
| E-10* | Pt—Fe—Co—Cu/C | 81 | 69 | 39 | 57 |
| E-11* | Pt—Fe—Co—Cu/C | 86 | 77 | 51 | 66 |
| E-12* | Pt—Fe—Co—Cu/C | 78 | 57 | 38 | 67 |
| E-13* | Pt—Fe—Co—Cu/C | 76 | 53 | 38 | 71 |
| E-14* | Pt—Fe—Co—Cu/C | 93 | 54 | 40 | 74 |
| E-15* | Pt—Fe—Co—Cu/C | 88 | 57 | 38 | 67 |

TABLE 4

| Electrode No. | Catalyst | Oxygen reduction specific activity (μA/cm² Pt) | EC.MSA (m²/g Pt) Before testing | After testing for 50 hours at 200° C. and +0.7 V | Retention (%) |
| --- | --- | --- | --- | --- | --- |
| E-1* | Pt/C | 33 | 120 | 48 | 40 |
| E-16* | Pt—Fe/C | 79 | 81 | 50 | 62 |
| E-17* | Pt—Fe/C | 72 | 73 | 53 | 70 |
| E-21* | Pt—Fe/C | 80 | 67 | 49 | 73 |
| E-22* | Pt—Co/C | 46 | 100 | 68 | 68 |
| E-23* | Pt—Co/C | 51 | 91 | 65 | 71 |
| E-24* | Pt—Cu/C | 108 | 82 | 64 | 78 |
| E-25* | Pt—Cu/C | 102 | 80 | 58 | 72 |
| E-26* | Pt—Fe—Co/C | 102 | 82 | 58 | 70 |
| E-27* | Pt—Fe—Cu/C | 118 | 77 | 57 | 74 |
| E-28* | Pt—Fe—Cu/C | 132 | 75 | 60 | 80 |
| E-29* | Pt—Co—Cu/C | 85 | 80 | 46 | 58 |
| E-30* | Pt—Cr—Co/C | 83 | 77 | 57 | 66 |
| E-31* | Pt—Co—Ni/C | 90 | 88 | 56 | 64 |
| E-32* | Pt—Cr—Ni/C | 73 | 83 | 54 | 64 | electrodes E-1*, E-2, E-3*, E-4 to E-9, E-10* to E-17*, E-18 to E-20, and E-21* to E-32* corresponding to the catalysts C-1*, C-2, C-3*, C-4 to C-9, C-10* to C-17*, C-18 to C-20, and C-21* to C-32*. These electrodes were produced so that they contained 0.50 mg of the deposited metals (i.e., Pt or Pt alloys) per cm² of the electrode.

The catalysts and electrodes obtained in the foregoing examples and comparative examples were subjected to the following tests.

[C] Performance test I. Test for specific activity of an oxygen reduction reaction Oxygen half cell performance was measured on each of the electrodes E-1*, E-2, E-3*, E-4 to E-9, E-10* to E-17*, E-18 to E-20, E-21* to E-32*, by passing an oxygen ($O_2$) gas at a flow rate of 600 ml/min. over an electrode sample (24 mm in diameter) using 105% phosphoric acid as an electrolyte at 200° C. A half cell performance curve of internal resistance-free (IR-free) terminal voltage vs. current densities was obtained. The current density (mA/cm²) of each of these electrodes at +900 mV vs. RHE was determined. The current density was divided by the loaded amount of Pt per unit electrode area, and further by the EC.MSA (m²/g Pt)

The electrodes of the carbon-supported Pt-Fe-Co-Cu ordered alloy catalysts within the scope of the invention (E-2, E-4 to E-9, and E-18 to E-20) showed 3.6 to 4.0 times as high activity as the electrode of the platinum alone catalyst (E-1*). These electrodes had distinctly higher activity than any one of conventional supported binary or ternary alloy catalyst electrodes, Pt-Fe/C (E-16*, E-17*), Pt-Co/C (E-22*, E-23*), Pt-Cu/C (E-24*, E-25*), Pt-Fe-Co/C (E-26*), Pt-Cr-Co/C (E-30*) Pt-Co-Ni/C (E-31*),and Pt-Cr-Ni/C (E-32*) or than a ternary alloy Pt-Co-Cu/C (E-29*) of another combination presumed. The ternary ordered alloy catalysts Pt-Fe-Cu/C (E-27* and E-28*), of which invention was described in the previous patent application (Japanese Patent Application No. 211621/1988) by the same inventors of this patent application, had higher activities than the conventional catalysts described above, but the activities of the Pt-Fe-Co-Cu/C catalysts of this invention surpassed them. Among the Pt-Fe-Co-Cu ordered alloy catalysts, tetragonal ordered alloy catalysts (E-7 to E-9, and E-18 to E-20) had about 8% higher activity on an average than cubic ordered alloy catalysts of the same composition (E-2, E-4 to E-6). Of the Pt-Fe-Co-Cu tetragonal ordered alloy catalysts, catalysts (E-18 to E-20) obtained by two-step alloying at low temperatures had almost the same specific activity as the catalysts prepared by the high temperature one-step alloying (E-7 to E-9). But since the former has a higher MSA, the mass activity of the former catalysts was 9 to 55% higher than the latter.

The specific activity of Pt-Fe-Co-Cu ordered alloys which contained less than 40 atomic % of Pt (E-10* and E-15*), or contained larger than 70 atomic % of Pt (E-11* and E-12*), or contained less than 9 atomic % of Fe, Co or Cu or more than 27 atomic % of Fe, Co or Cu (E-12*, E-13*, E-14* and E-15*) was at best equivalent to that of the conventional binary or ternary alloy catalysts.

Tetragonal ordered alloys which fall outside the preferred composition range of this invention (40 to 70 atomic % of Pt, 9 to 27 atomic % of Fe, 9 to 27 atomic % of Co, and 9 to 27 atomic % of Cu) (E-13* to E-15*, E-21* and E-28*) had the same specific activity as that of the conventional catalysts.

A Pt-Fe-Co-Cu quaternary catalyst, which had the composition range of this invention but was insufficiently alloyed, (E-3*), had at best the same specific activity than the conventional catalysts.

II. Test for electrode stability

A test sample of each of electrodes E-1*, E-2, E-3*, E-4 to E-9, E-10* to E-17*, E-18 to E-20, and E-21* to E-32* was immersed in 100 ml of 105% phosphoric acid contained in an aging cell. While the atmosphere was purged with a dry nitrogen gas stream and a constant voltage of +700 mV (vs. RHE) was loaded, the sample was maintained at 200° C. for 50 hours. Then, its EC.-MSA was measured, and compared with that of the sample before the treatment. The results are shown in Tables 3 and 4.

The electrodes of Pt-Fe-Co-Cu ordered alloy catalysts of this invention E-2, E-4 to E-9 and E-18 to E-20 showed at least 1.8 times as much stability (the ratio of the retention rate of EC.MSA) as the electrode E-1* of a catalyst of Pt alone.

Among the conventional binary or ternary alloy catalysts, only Pt-Cu/C (E-24*) and Pt-Fe-Cu/C (E-28*) were comparable to the above catalysts. The high stability of Pt-Fe-Cu/C (E-28*) was presumably due to the fact that its alloy crystal structure is similar to the Pt-Fe-Co-Cu ordered alloy of this invention. In order to be a catalyst of high performance, however, its stability alone is not important. It should have both high specific activity and high stability.

The specific activity of Pt-Cu (E-24*) does not reach that of Pt-Fe-Co-Cu ordered alloy catalysts of this invention. Even if it is a Pt-Fe-Co-Cu ordered alloy, but if its composition falls outside the composition range of this invention, namely 40 to 70 atomic % of Pt, 9 to 27 atomic % of Fe, 9 to 27 atomic % of Co, and 9 to 27 atomic % of Cu, its EC.MSA retention is lower than 70% (E-10* to E-12* and E-15*), or its initial EC.MSA itself is remarkably low (E-13* to E-14*). A catalyst, which is within the preferred composition range of Pt-Fe-Co-Cu of this invention but is not an ordered alloy, (E-3*), has low stability and showed only the same stability as the conventional binary or ternary alloy catalysts.

III. Test of fuel cell (single cell)

Figure 3:
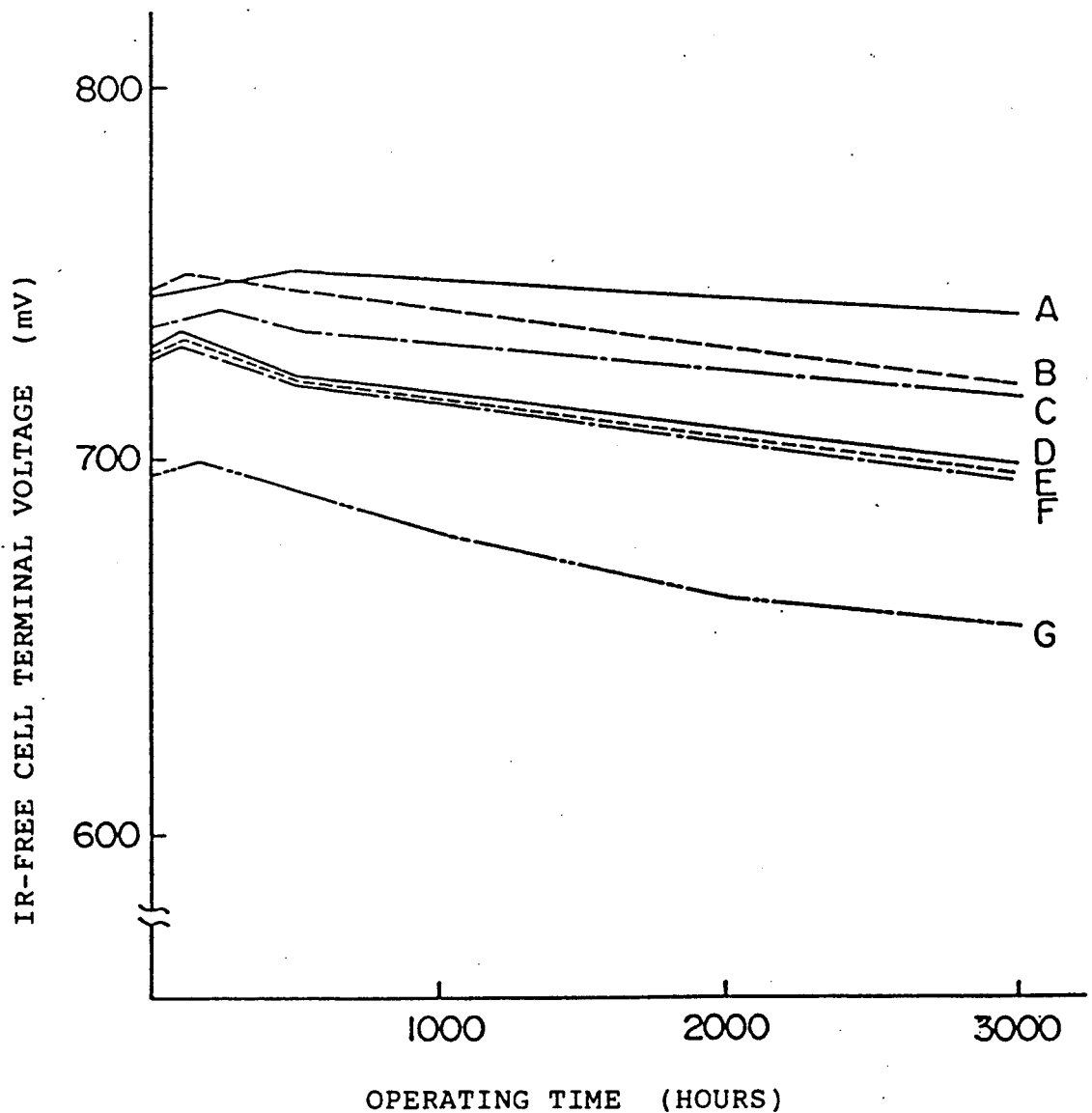
FIG. 3 shows changes with time during an operation of 3,000 hours in the IR-free terminal voltage of single cells comprising an electrode including supported platinum-iron-cobalt-copper quaternary ordered alloy catalyst which is within the scope of the invention, or conventional electrodes including a catalyst comprising platinum alone or multi-component platinum alloy catalysts used as a cathode.

A small-sized single cell (effective electrode area 7.4 cm × 7.4 cm) was assembled by using electrode E-1* as an anode, and each of electrodes E-1*, E-16*, E-19, E-24*, E-26*, E-28*, and E-30* as a cathode. While feeding hydrogen and air to the anode and cathode respectively at a flow rate of 100 ml/min. and 600 ml/min., the cell was operated at a current density of 160 mA/cm$^2$ for 3,000 hours by using 85% phosphoric acid as an electrolyte. FIG. 3 shows changes with time in the IR-free cell terminal voltage of each single cell.

The single cell using electrode E-19 prepared by using the Pt-Fe-Co-Cu ordered alloy catalyst of this invention as the cathode, in its initial performance at 300 hours after the start of operation, showed a cell terminal voltage higher by 55 mV, 28 mV, 14 mV, 6 mV, 5 mV and 23 mV than the single cells using the comparative Pt/C electrode (E-1*), Pt-Fe/C electrode (E-16*), Pt-Cu/C electrode (E-24*), Pt-Fe-Co/C electrode (E-26*), Pt-Fe-Cu/C electrode (E-38*) and Pt-Cr-Co/C electrode (E-30*) as cathode, respectively.

In addition to the higher initial cell voltage, the single cell using E-19 as the cathode showed a markedly suppressed decay rate of cell voltage of about 4 mV/1,000 hours, as compared with the decay rates of about 15 mV/1,000 hours of the single cell including E-1* as the cathode and 10 mV/1,000 hours of the single cells including E-16*, E-26* and E-30* as the cathode respectively. The decay rate of the single cell including E-19 as the cathode was about 20% lower than the decay rate 5 mV/1,000 hours of the single cell including E-24* as the cathode.

As shown above, the carbon powder-supported Pt-Fe-Co-Cu ordered alloy electrocatalyst of this invention shows a much higher performance than conventional multi-component alloy catalysts both in respect of initial activity and active lifetime as a cathode catalyst for a fuel cell. An acid electrolyte fuel cell constructed by using this electrocatalyst and a suitable supporting member has an excellent output performance and a long operation life, and brings about a great economical effect.

We claim:

1. A platinuim alloy electrocatalyst comprising an electrically conductive carrier and dispersed in, and deposited on it, a platinum-iron-cobalt-copper quaternary ordered alloy composed of 40 to 70 atomic % of platinum, 9 to 27 atomic % of iron, 9 to 27 atomic % of cobalt and 9 to 27 atomic % of copper.

2. The platinum alloy electrocatalyst in which the platinum-iron-cobalt-copper quaternary ordered alloy is of a face-centered cubic structure.

3. The platinum alloy electrocatalyst of claim 2 in which the platinum-iron-cobalt-copper quaternary ordered alloy is deposited in a highly dispersed state on the conductive carbon powder carrier with an average crystallite size of not more than 100Å.

4. The platinum alloy electrocatalyst of claim 2 in which the platinum-iron-cobalt-copper quaternary ordered alloy is deposited in a highly dispersed state on the conductive carbon powder carrier in a highly dispersed state with an average crystallite size of not more than 50Å.

5. The platinum alloy electrocatalyst of claim 1 in which the platinum-iron-cobalt-copper quaternary ordered alloy is of a face-centered tetragonal structure.

6. The platinum alloy electrocatalyst of claim 5 in which the platinum-iron-cobalt-copper quaternary ordered alloy is deposited in a highly dispersed state on the conductive carbon powder carrier with an average crystallite size of not more than 100Å.

7. The platinum alloy electrocatalyst of claim 5 in which the platinum-iron-cobalt-copper quaternary ordered alloy is deposited in a highly dispersed state on the conductive carbon powder carrier with an average crystallite size of not more than 50Å.

8. The platinum alloy electrocatalyst of claim 1 in which the conductive carrier is a conductive carbon.

9. The platinum alloy electrocatalyst of claim 8 in which the conductive carrier is selected from the group consisting of a conductive carbon black powder, an acetylene black powder and a graphite powder.

10. The platinum alloy electrocatalyst of claim 1 in which a platinum-iron-cobalt-copper quaternary ordered alloy is dispersed in and deposited on the conductive carrier in a highly dispersed state with a metal surface of at least 30 m$^2$/g.

11. The platinum alloy electrocatalyst of claim 1 in which a platinum-iron-cobalt-copper quaternary ordered alloy is dispersed in and deposited on the conductive carrier in a highly dispersed state with a metal surface of at least 60 m$^2$/g.

12. An electrode for an acid electrolyte fuel cell, said electrode comprising a supported platinum alloy electrocatalyst, a water-repellent binder, and an electrically conductive and acid-resistant supporting member to which the electrocatalyst and the water-repellent binder are bonded, said electrocatalyst consisting essentially a conductive powder catalyst comprising a conductive carrier and dispersed in, and deposited on it, a platinum-iron-cobalt-copper quaternary ordered alloy composed of 40 to 70 atomic % of platinum, 9 to 27 atomic % of iron, 9 to 27 atomic % of cobalt and 9 to 27 atomic % of copper.

13. The electrode of claim 12 in which the platinum-iron-cobalt-copper quaternary ordered alloy is of a face-centered cubic structure.

14. The platinum alloy electrocatalyst of claim 12 in which the platinum-iron-cobalt-copper quaternary ordered alloy is deposited in a highly dispersed state on the conductive carrier with an average crystallite size of not more than 100Å.

15. The platinum alloy electrocatalyst of claim 12 in which the platinum-iron-cobalt-copper quaternary ordered alloy is deposited in a highly dispersed state on the conductive carrier in a highly dispersed state with an average crystallite size of not more than 50Å.

16. The electrode of claim 12 in which the platinum-iron-cobalt-copper quaternary ordered alloy is of a face-centered tetragonal structure.

17. The electrode of claim 16 in which the platinum-iron-cobalt-copper quaternary ordered alloy is deposited on the conductive carrier in a highly dispersed state with an average crystallite size of not more than 100Å.

18. The electrode of claim 16 in which the platinum-iron-cobalt-copper quaternary ordered alloy is deposited on the conductive carrier in a highly dispersed state with an average crystallite size of not more than 50Å.

19. The electrode of claim 12 in which the conductive carrier is a conductive carbon.

20. The electrode of claim 19 in which the conductive carrier is at least one conductive carbon powder selected from the group consisting of a conductive carbon black powder, an acetylene black powder and a graphite powder.

21. The electrode of claim 12 in which the platinum-iron-cobalt-copper quaternary ordered alloy is dispersed in, and deposited on, the conductive carrier in a highly dispersed state with a metal surface area of at least 30 m$^2$/g.

22. The electrode of claim 12 in which the platinum-iron-cobalt-copper quaternary ordered alloy is dispersed in, and deposited on, the conductive carrier in a highly dispersed state with a metal surface area of at least 60 m$^2$/g.

* * * * *